United States Patent [19]
Faris et al.

[11] Patent Number: 5,262,936
[45] Date of Patent: Nov. 16, 1993

[54] IRRIGATION CONTROLLER HAVING EXPANSION AND PUMP MODULES

[75] Inventors: Mark Faris, Yucaipa; Richard H. Bancroft; Leonard W. Doup, both of Riverside; Alberto D. Benmergui, Alta Loma; Gerald L. Mock, Corona, all of Calif.

[73] Assignee: The Toro Company, Minneapolis, Minn.

[21] Appl. No.: 698,710

[22] Filed: May 10, 1991

[51] Int. Cl.⁵ .................. G06F 15/46; G05D 7/06
[52] U.S. Cl. ..................... 364/140; 239/70; 364/143; 364/420; 364/510
[58] Field of Search ............... 364/140–147, 364/509, 510, 420; 137/624.11–624.22; 239/68, 70

[56] References Cited
U.S. PATENT DOCUMENTS

| | | | |
|---|---|---|---|
| 3,599,867 | 8/1971 | Griswold et al. | 137/87.3 |
| 4,209,131 | 6/1980 | Barash et al. | 364/144 X |
| 4,539,655 | 9/1985 | Trussell et al. | 395/325 |
| 5,025,361 | 6/1991 | Pitman et al. | 364/143 |

*Primary Examiner*—Joseph Ruggiero
*Attorney, Agent, or Firm*—James W. Miller

[57] ABSTRACT

An irrigation controller contains a base unit having drivers and output switches for controlling a number of irrigation stations which is less than the maximum number of stations for which the controller is designed. Station expansion modules are provided having the drivers and output switches for incremental numbers of stations. The station expansion modules can be individually bought and connected to the base unit to expand the number of available irrigation stations up to the maximum number of stations. A microprocessor in the base unit can be programmed and controls all of the stations, both those in the base unit and those in the station expansion modules. Pump and accessory timer modules can also be provided for optionally driving a pump and/or an accessory device such as a lighting system.

4 Claims, 14 Drawing Sheets

FIG. 7

IRRIGATION CONTROLLER HAVING EXPANSION AND PUMP MODULES

TECHNICAL FIELD

The present invention relates to an irrigation controller for controlling the operation of an irrigation system. More particularly, the present invention relates to an irrigation controller for controlling multiple irrigation stations and certain accessory items.

BACKGROUND OF THE INVENTION

Irrigation systems are well known for irrigating lawns and other areas of ground. These systems typically include an irrigation controller which retains a desired sequence of irrigation operation instructions known as the irrigation program. The controller is connected to one or more valves each of which comprises an irrigation station. The valves may be electrically or hydraulically operated and supply water to one or more sprinklers connected to the valves. Basically, as time passes, the controller sends signals to the valves at predetermined times and in predetermined order, such instructions comprising the irrigation program, to turn the valves on and off, thus operating the irrigation system in accordance with the program.

Irrigation controllers have been provided in the past in different models tailored for different installations. The purchaser would buy a controller suited for the number of stations which the irrigation system was intended to have. For example, if the system was designed with four irrigation stations, the user would buy a four-station irrigation controller. Similarly, if the system was designed to have eight stations, the user would purchase an eight-station controller, and so on.

One difficulty with this approach is that expansion of the irrigation system to more than the number of stations for which the controller was rated required the purchase of a new and larger controller. It is not unusual for the number of irrigation stations to be increased over time as the user irrigates other areas of the property, or adds different vegetation to the currently irrigated area. In these circumstances, the investment in the original irrigation controller is generally wasted and a new controller has to be purchased.

In some irrigation systems, a pump is required to pressurize the irrigation system and allow irrigation to take place. The pump is activated by the controller whenever any watering is scheduled. Thus, most irrigation controllers have various circuitry and drivers for activating a pump. However, not all irrigation systems require the use of a pump. Some irrigation systems are installed in water supply systems that are already pressurized, e.g. a city water system. In this case, pump circuitry in the controller is not needed and the controller is, in effect, more costly than it needs to be.

Another need many people have is some efficient way to control an outdoor lighting system. Low voltage lighting systems are well known for illuminating yards, walkways and the like. Typically, fairly rudimentary timers are provided for turning the lights on at night and off in the morning. Such timers have, however, been separate from the controllers used to control irrigation systems. Thus, if a particular customer had both an irrigation system and an outdoor lighting system, both an irrigation controller would have to be purchased along with a timer for operating the lights.

Accordingly, there is a need for an irrigation controller which can be better matched to a customer's precise needs, but which could also be easily expanded to meet other needs. For example, it would be desirable for the same controller to be expandable to control more than the originally purchased number of irrigation stations without having to purchase an entirely new controller. It is also desirable for such a controller to be able to optionally control a pump if such is required, but otherwise to be built without the pump circuitry and drivers. Ideally, the same controller should also be able to drive an outdoor lighting system.

Various attempts have been made to provide controllers with expandable capacity in the irrigation industry. One such controller is known as the Oasis Modular Controller. This controller is capable of driving anywhere from four to forty-two stations. However, the controller has certain disadvantages because it is not truly modular.

The Oasis Modular controller includes all of the circuitry and drivers for driving all forty-two stations even when only four stations are desired. The user selects the number of stations required by inserting a programmable chip which utilizes that portion of the controller circuitry required for the desired number of stations. The number of stations selected is changed by removing the first chip and inserting a second chip which can control more stations.

The disadvantage in the Oasis controller is that it has to be manufactured to accommodate the maximum number of stations desired under the assumption that all such stations might be used. To that extent the controller is provided with circuitry and drivers for all 42 stations even though most irrigation systems would probably have far fewer than 42 stations. Thus, the Oasis controller is more expensive and has more capacity than many irrigation systems would require. In addition, the Oasis controller includes pump circuitry, whether such circuitry is required or not in a particular system.

SUMMARY OF THE INVENTION

The present invention relates to an irrigation controller which can be expanded easily to satisfy a user's future needs while being tailored precisely to the user's current needs.

An irrigation controller according to the present invention comprises a base unit having logic means for storing and executing an irrigation program with the logic means having sufficient capacity for controlling a plurality of irrigation stations up to a predetermined maximum number of stations. In addition, the base unit includes driver means for actuating a predetermined minimum number of irrigation stations which is less than the maximum number of stations which can be controlled by the logic means. In addition, one or more modules are provided each of which contains the driver means for an incremental number of stations. The modules may be selectively coupled to the base unit to expand the number of stations that can be controlled. The total number of stations controlled by the logic means is the number of stations provided by the driver means on the base unit and the driver means on the modules connected to the base unit up to the maximum capacity of the logic means.

BRIEF DESCRIPTION OF THE DRAWINGS

The present invention will be described in more detail hereafter in the following Detailed Description, when taken in conjunction with the following drawings, in which like reference numerals refer to like elements throughout.

DETAILED DESCRIPTION

Figure 1:
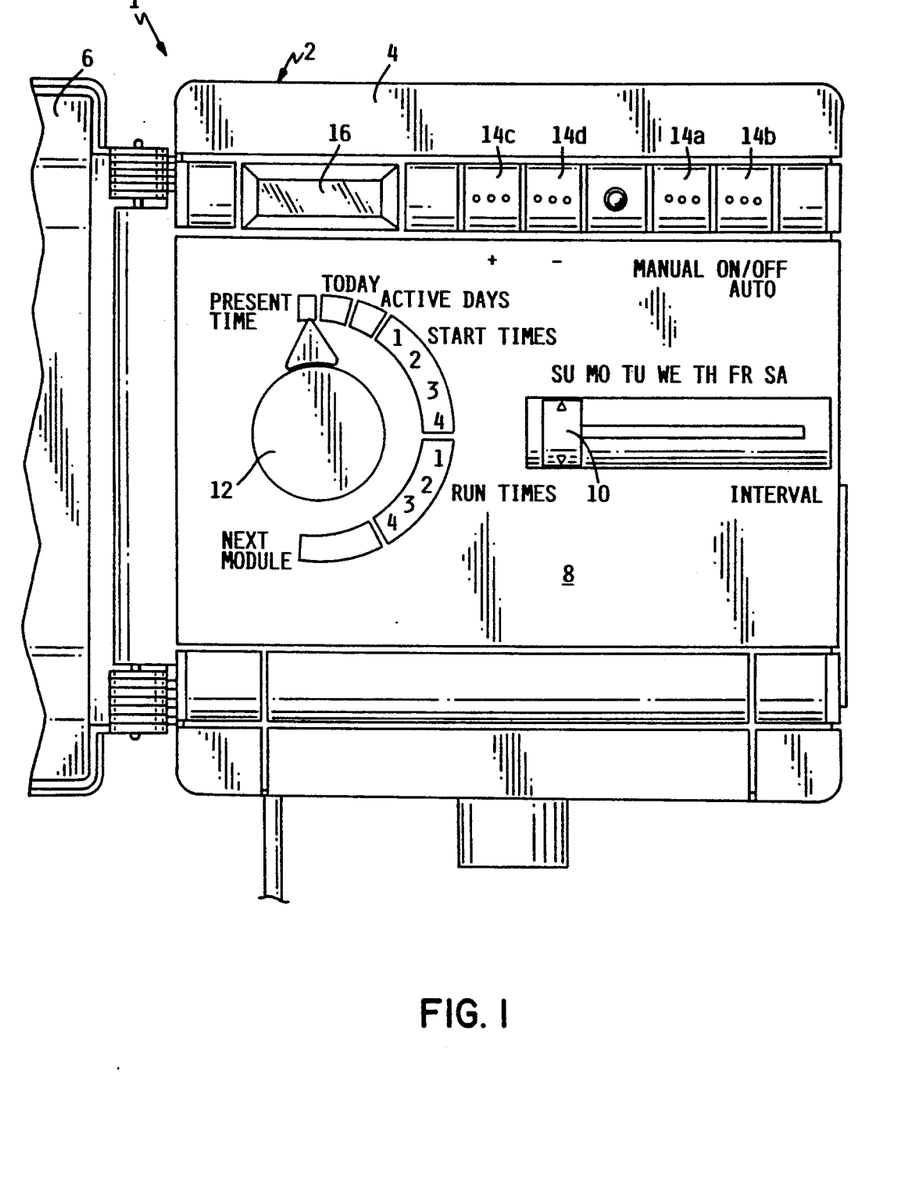
FIG. 1 is a partial top plan view of the base unit of the irrigation controller of the present invention, illustrating the cover thereof swung open to show the control panel and the various controls of the controller.
Figure 2:
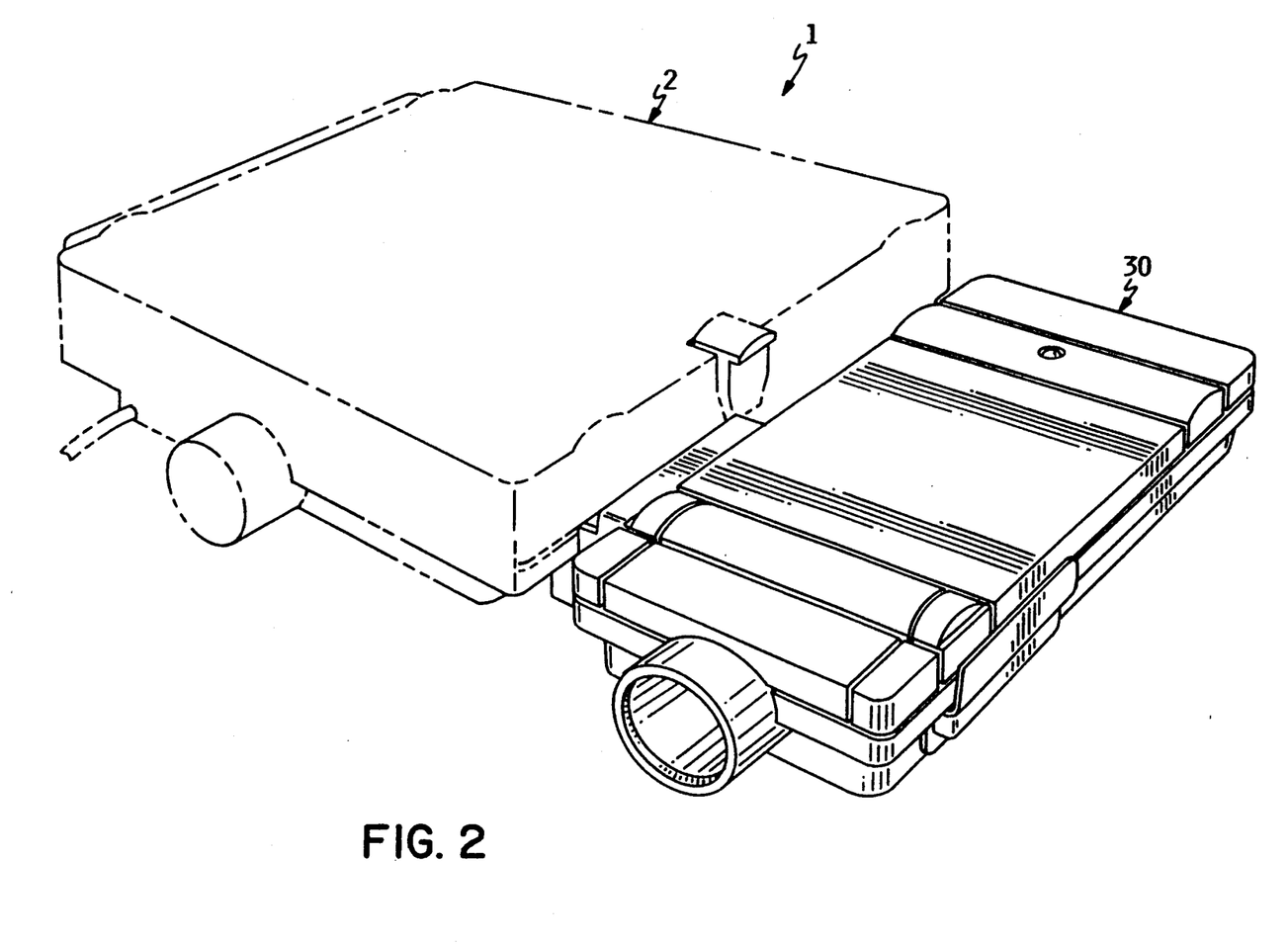
FIG. 2 is a perspective view of the base unit shown in FIG. 1 showing a typical module connected thereto.

Referring first to FIGS. 1 and 2, the irrigation controller 1 of the present invention includes a base unit identified generally as 2. Base unit 2 includes a housing 4 which may be mounted on a wall or the like and which has a pivotal lid or cover 6. When cover 6 is swung open, a face plate or control panel 8 of housing 4 is exposed to the user.

Various operational controls are mounted on control panel 8. These controls include a slider 10 for selecting the days of the week during programming, a rotary knob 12 for selecting various settable or programmable parameters involved in the irrigation program, and various push button controls identified generally as 14. Push button controls 14 include a manual override button 14a, an on/off and automatic mode button 14b and plus/minus control buttons 14c and 14d for incrementing and decrementing the various parameters during programming or controller setup. In addition, an LCD display 16 is provided.

The type of irrigation program which can be stored in and executed by the controller is generally well known in the art. Other prior art controllers can store and execute much the same type of program though there may be some difference in the controls used to input the program into the controller and the manner in which the controls are manipulated. Thus, no general inventive claim is being made to the exact controls employed on the controller on the type of program which can be stored and executed. The type of controls and the exact nature of the program could be varied as desired. Accordingly, the controls will be described only briefly to give the reader a general understanding of their use.

Controller 1 is programed through the operation of rotary knob 12 and the manipulation of the plus/minus control buttons 14c and 14d in conjunction with display 16. For example, when knob 12 is in its indicated position in FIG. 1, the plus/minus control buttons 14c and 14d can be used to set the present time of day with the current value being shown in display 16 so the user can observe when the correct value is reached. Knob 12 can then be turned through the other positions to set or program in the various other parameters which are shown, again using control buttons 14c and 14d while observing display 16. For example, the current day of the week can be set next, then what days in a particular time interval will be "active" days on which irrigation will take place, then up to 4 "start" times for setting up to 4 times on each active day when irrigation will commence, and then finally the "run" time for each of at least 4 stations indicating how long irrigation will take place at each station after watering begins. When setting the active days with knob 12 positioned opposite the active days setting, slider 10 is moved to select a particular day and the plus/minus control buttons are used to select or deselect that day as an active day which is accomplished when the display 16 reads "Yes" or "No", respectively.

The stations are sequentially operated by the controller after a start time is reached. For example, controller 1 can be programmed so that Mondays, Wednesdays and Fridays are "active" days, that watering will start at 3:00 a.m., at 6:00 a.m., at 11:00 a.m. and so forth, and that station 1 will water for 10 minutes, station 2 for 20 minutes, station 3 for 30 minutes, etc. Thus, at 6:00 a.m. on Monday, watering begins at station 1 for 10 minutes, then at station 2 for 20 minutes, then at station 3 for 30 minutes, until all stations for which a run time has been set have been accounted for. Collectively, these remembered instructions comprise what is generally known as the "irrigation program".

Figure 3A:
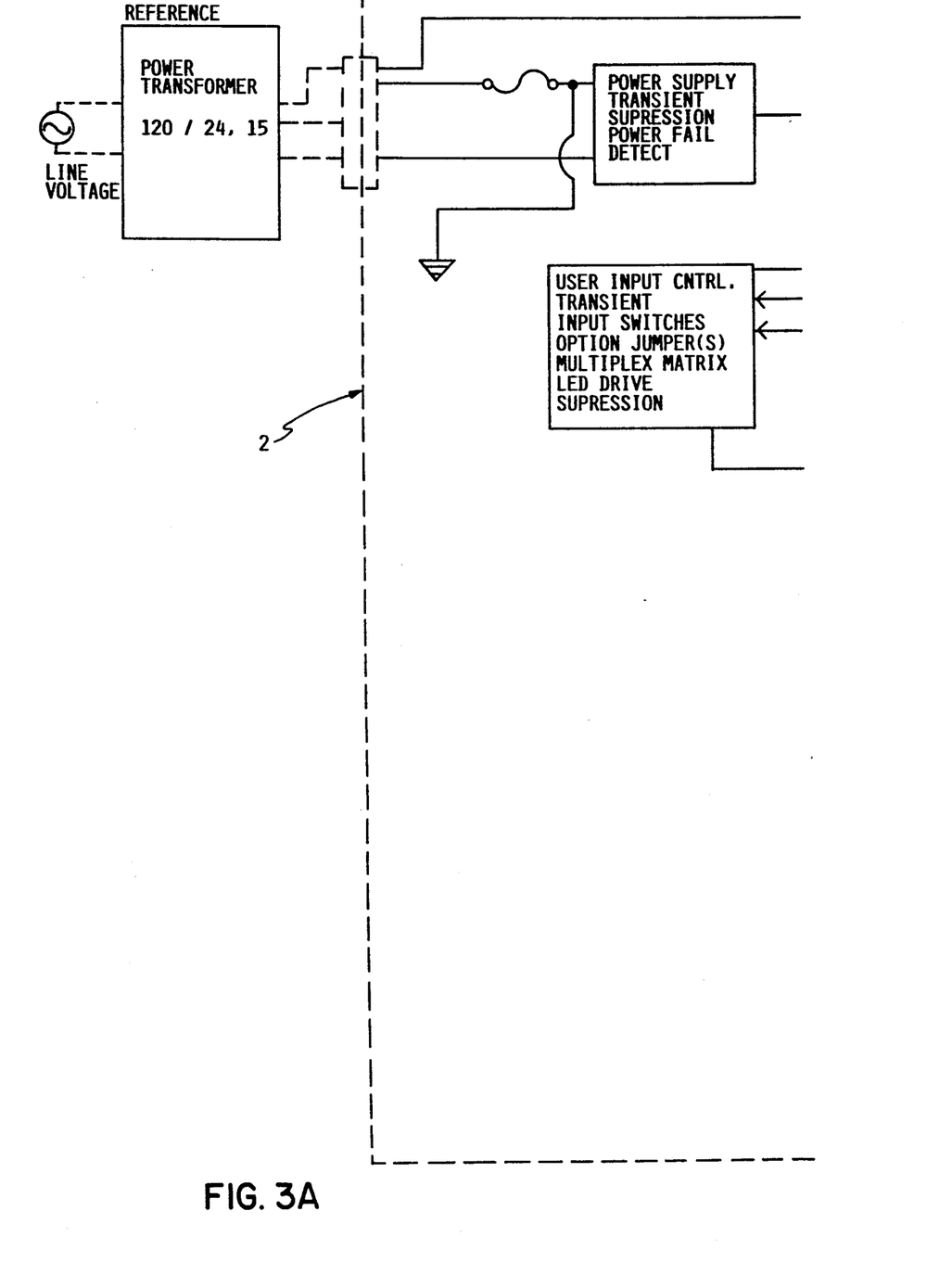
FIGS. 3A-3C comprise a block diagram of the irrigation controller of the present invention illustrating both the base unit and one module connected thereto.
Figure 3B:
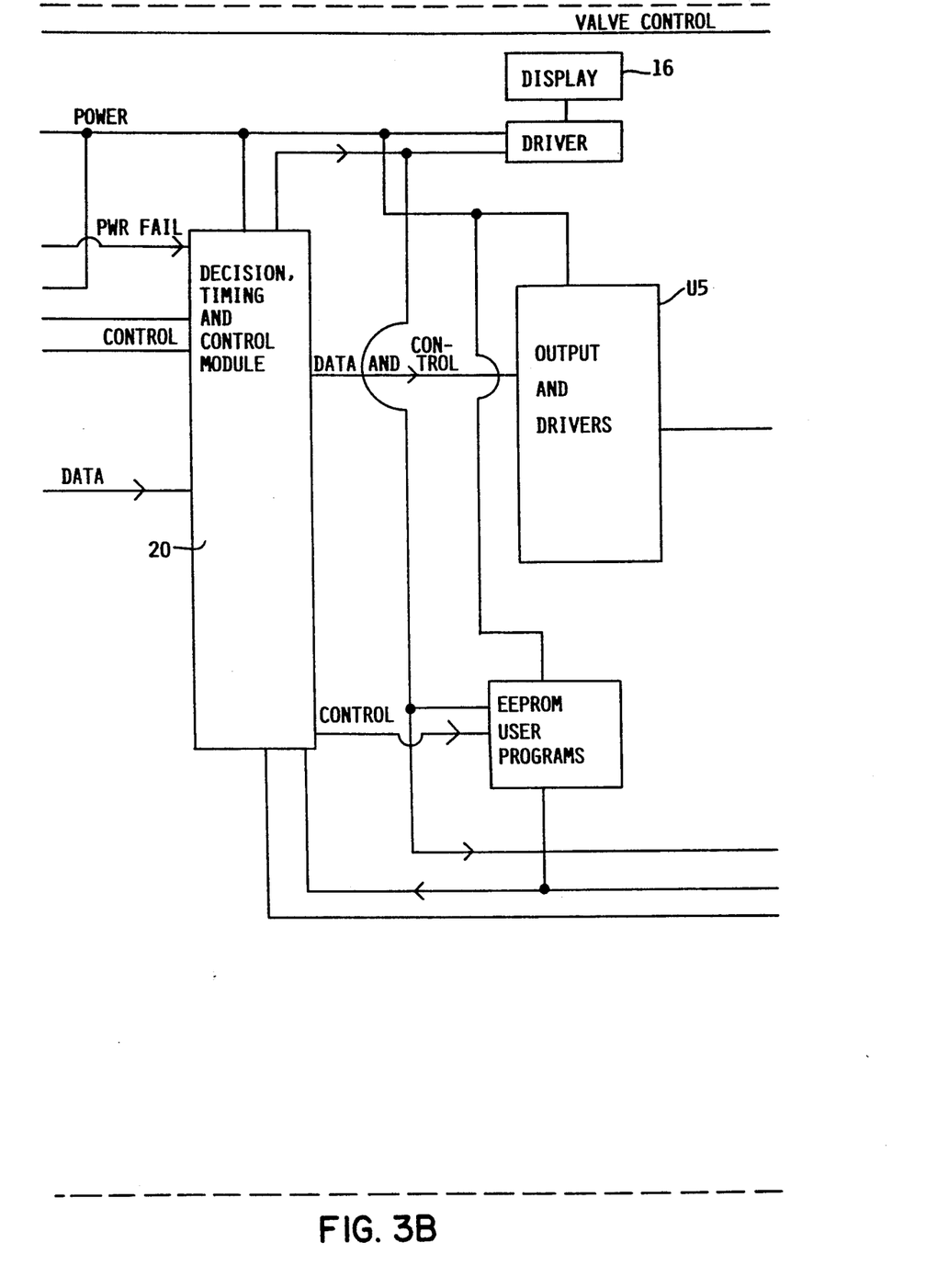
Figure 3C:
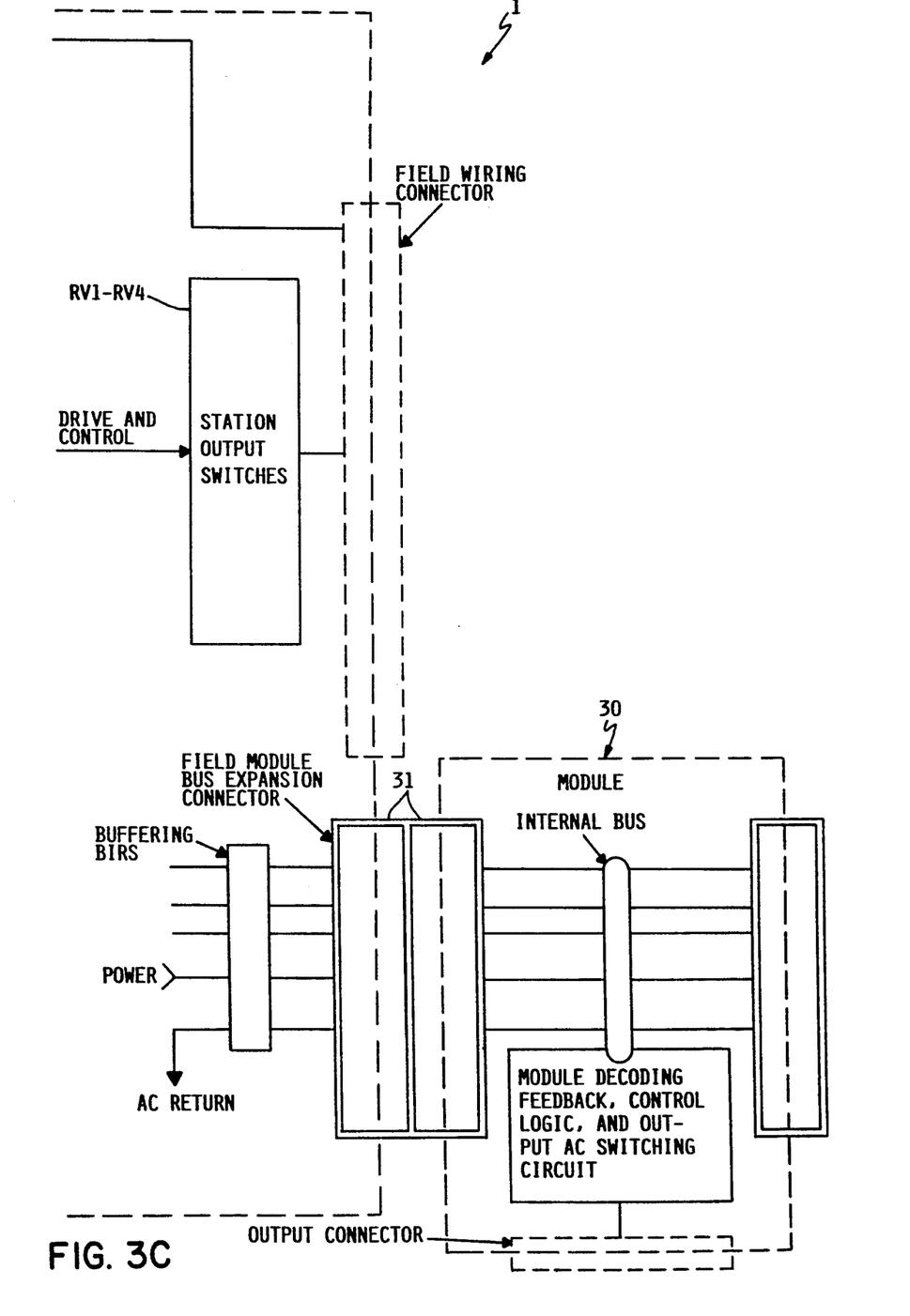

Turning now to the inventive features of controller 1, base unit 2 includes a microprocessor 20 of any suitable type or design which serves as the master logic means for controller 1. See FIGS. 3A-3C. Microprocessor 20 stores the instructions comprising the irrigation program and executes the stored instructions in accordance with the passage of time. When microprocessor 20 recognizes that watering should take place at a particular station, it executes the program by sending an output signal along the output line to the appropriate irrigation station to complete the electric circuit to the solenoid valve or other control device comprising that station, thus turning the valve on and supplying water to the sprinklers connected to that valve. After the particular "run" time for that station elapses, microprocessor 20 removes the output signal from that station, thereby terminating operation of the affected valve. Then, microprocessor 20 turns on the next station, if such is called for by the program, and so on. Microprocessor 20 is continuously active (as long as power is applied to controller 1) in monitoring the passage of time, responding to any new inputs from the operational controls, and executing the irrigation program when watering is called for. The use of a microprocessor for this purpose in irrigation controllers is well known.

As noted earlier, base unit 2 has the ability to independently control four irrigation stations, though this number is less than the maximum number of stations, i.e. twelve stations, which controller 1 is designed to control. In this regard, only the drivers and output switches for four stations are built into base unit 2. Referring to FIGS. 4A-4D, conventional drivers U5 are individually connected to various ports 12-15 of microprocessor 20 and drive conventional TRIACS RV1-RV4 which are themselves connected to individual terminals TB5-TB8 of an output terminal strip. The terminal strip may have other power output taps, e.g. a source of 24 V AC power for powering the stations, but there are only 4 station terminals for the 4 stations driven by the base unit. The individual stations are identiied as STA 1, STA 2, STA 3 and STA 4 in FIGS. 4A-4D. The output terminal strip is wired in a conventional way to the irrigation valves which define stations 1-4. Thus, to activate station 1, microprocessor 20 activates the driver U5 connected to TRIAC RV4 to cause power to be applied to the valve connected through the terminal strip to RV4. Typically, the valve activation will be accomplished by closing the valve common line for that station to complete the power circuit to that valve, with the TRIACS comprising normally open switches connected to ground.

Figure 4A:
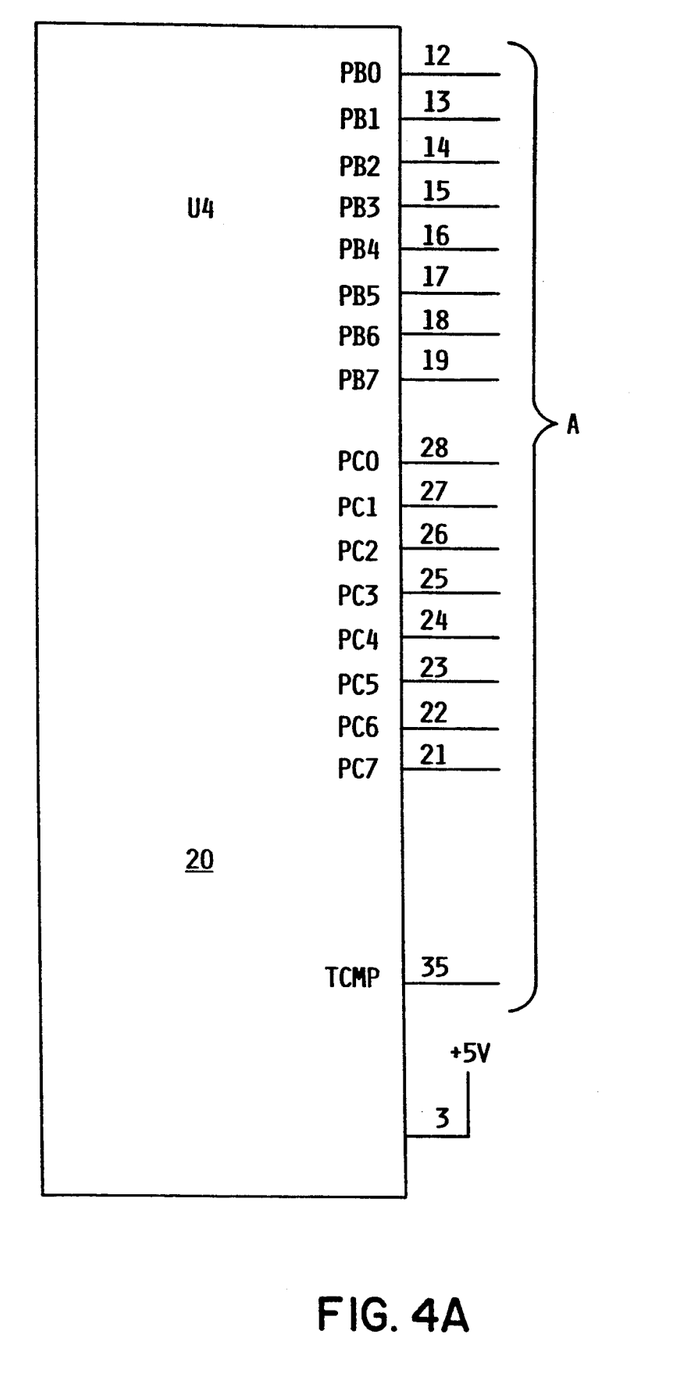
FIGS. 4A-4D comprise a portion of a circuit diagram of the base unit of the irrigation controller of the present invention.
Figure 4B:
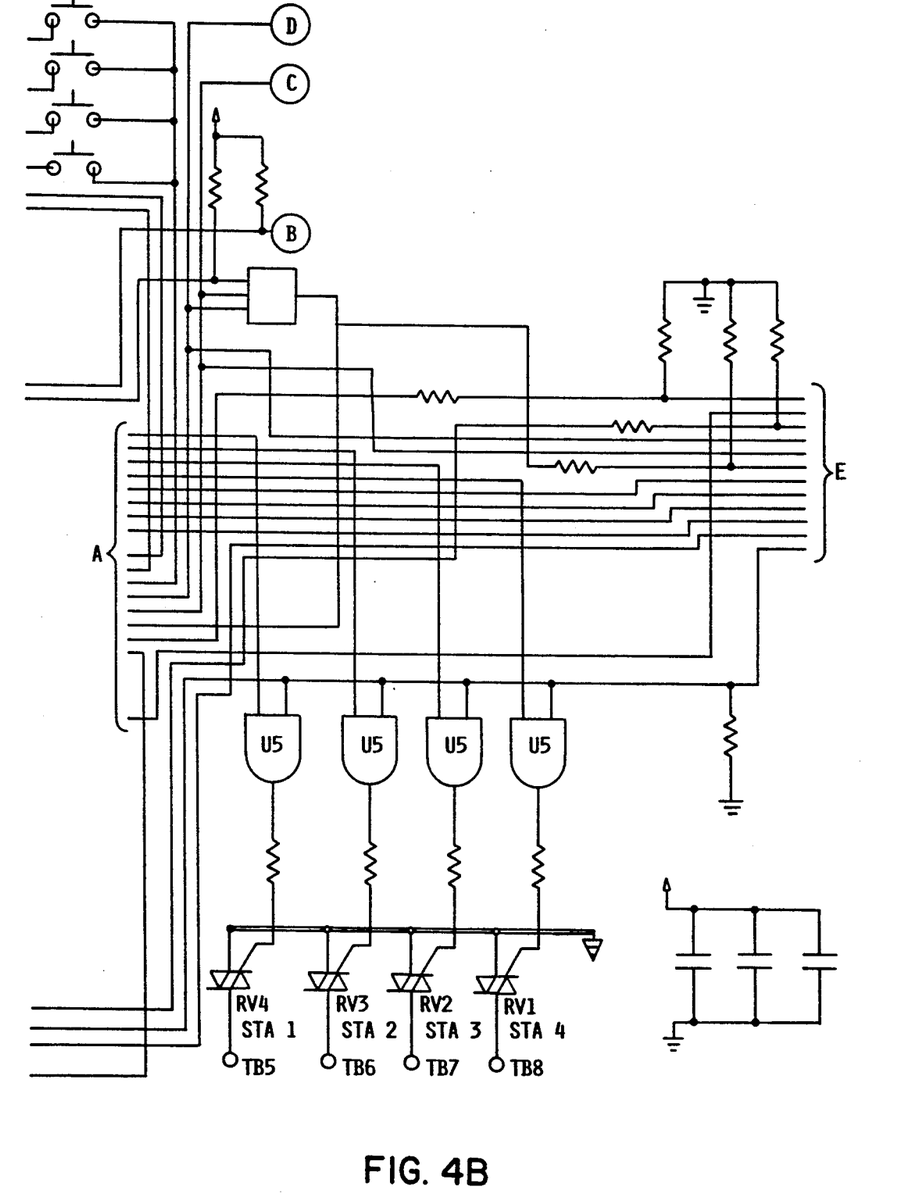
Figure 4C:
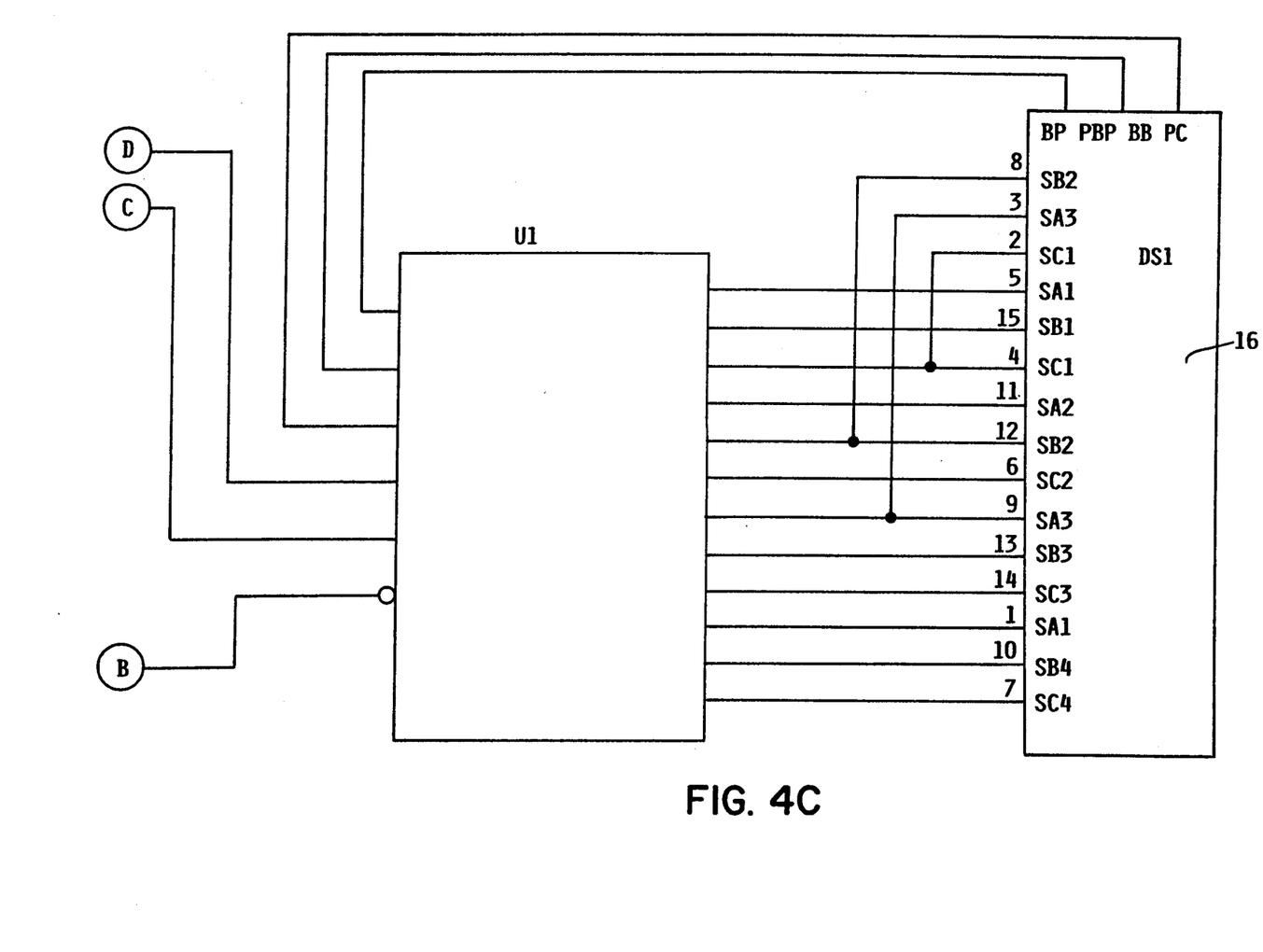
Figure 4D:
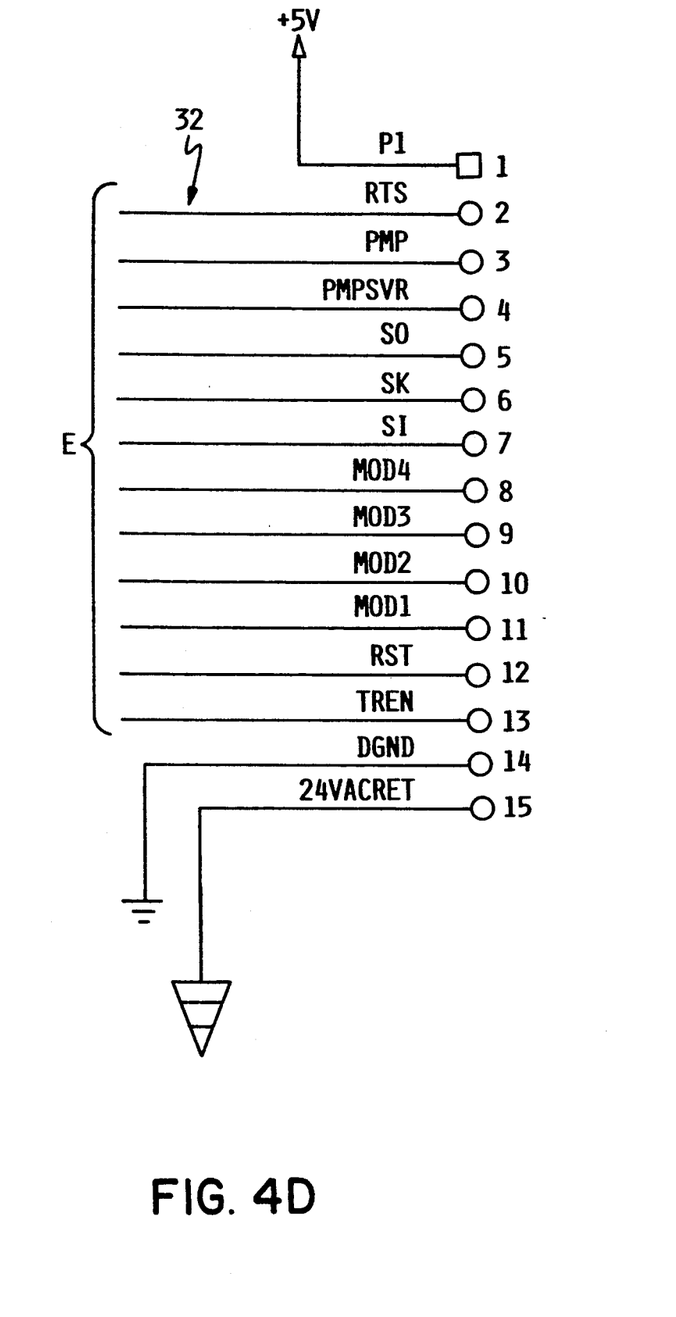

An important feature of the present invention is the use of a number of modules which may be individually purchased to expand the station capacity of controller 1. One such module 30 is shown in FIG. 2 having been connected to base unit 2. Module 30 serially interconnects to base unit 2 and to other modules 30 using bus expansion connectors 31. In this regard, a serial bus 32 is provided in base unit 2 and an identical serial bus 34 in each station module 30 as shown in FIGS. 4A-4B. Serial bus 32 interconnects with the buses 34 in modules through connectors 31.

Serial bus 32 comprises a plurality of signal pathways or traces 34 on the printed circuit boards used in the construction of base unit 2. Referring to FIGS. 4A-4D, trace 3 is a pump trace labelled PMP, traces 8-11 are traces for communicating with up to four modules serially connected to base unit 2 labelled as MOD. 1, MOD. 1, MOD. 3, MOD. 4, and trace 15 is a ground line for completing a 24 Volt AC circuit labelled 24 V ACRET.

Figure 5A:
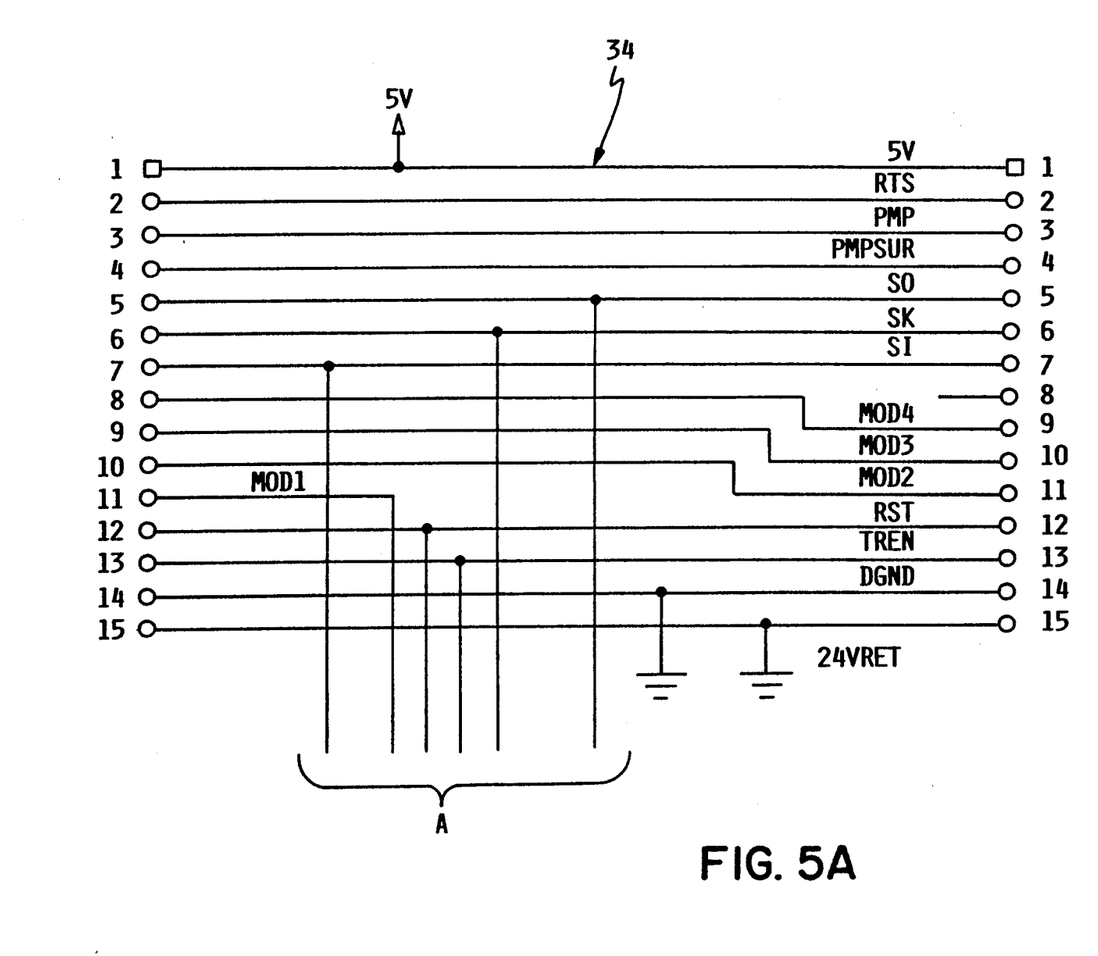
FIGS. 5A-5B comprise a circuit diagram of a four station module of the irrigation controller of the present invention.

The serial bus 34 in each station module 30, as shown in FIG. 5A, has an equivalent number of traces arranged in generally the same order. However, in each station module 30, incoming trace 11 is connected internally into the circuitry of module 30 and does not continue through to the output of trace 11. Instead, the other module traces 8-10 at the input side drop down one trace to become traces 9-11 at the output side of the module. This ensures that station modules 30 can be manufactured with identical serial buses 34, but will be appropriately referred to as module 1, module 2, module 3 when connected serially to base unit 2 and when accessed by base unit 2.

In this regard, assume two modules 30 are serially connected to base unit 2. The first connected module 30 will communicate with base unit 2 along trace 11 of base unit 2 which is known as MOD 1 by base unit. The next connected module will have its incoming MOD 1 trace, i.e. trace 11 at the input side of bus 34, connected to trace 11 at the output side of the first module. However, this output trace on the first module is itself connected to trace 10 at the output of base unit bus 32 so that the second module will automatically be connected to base unit 2 along the MOD 2 trace and will thus be known as the second module by the base unit. Thus, the consecutive step down in the module traces 8-11 between the input and output sides of the traces ensures that each consecutive module communicates with the base unit along a separate control trace with each consecutively connected module being known as module 1, module 2, and so forth.

Figure 5B:
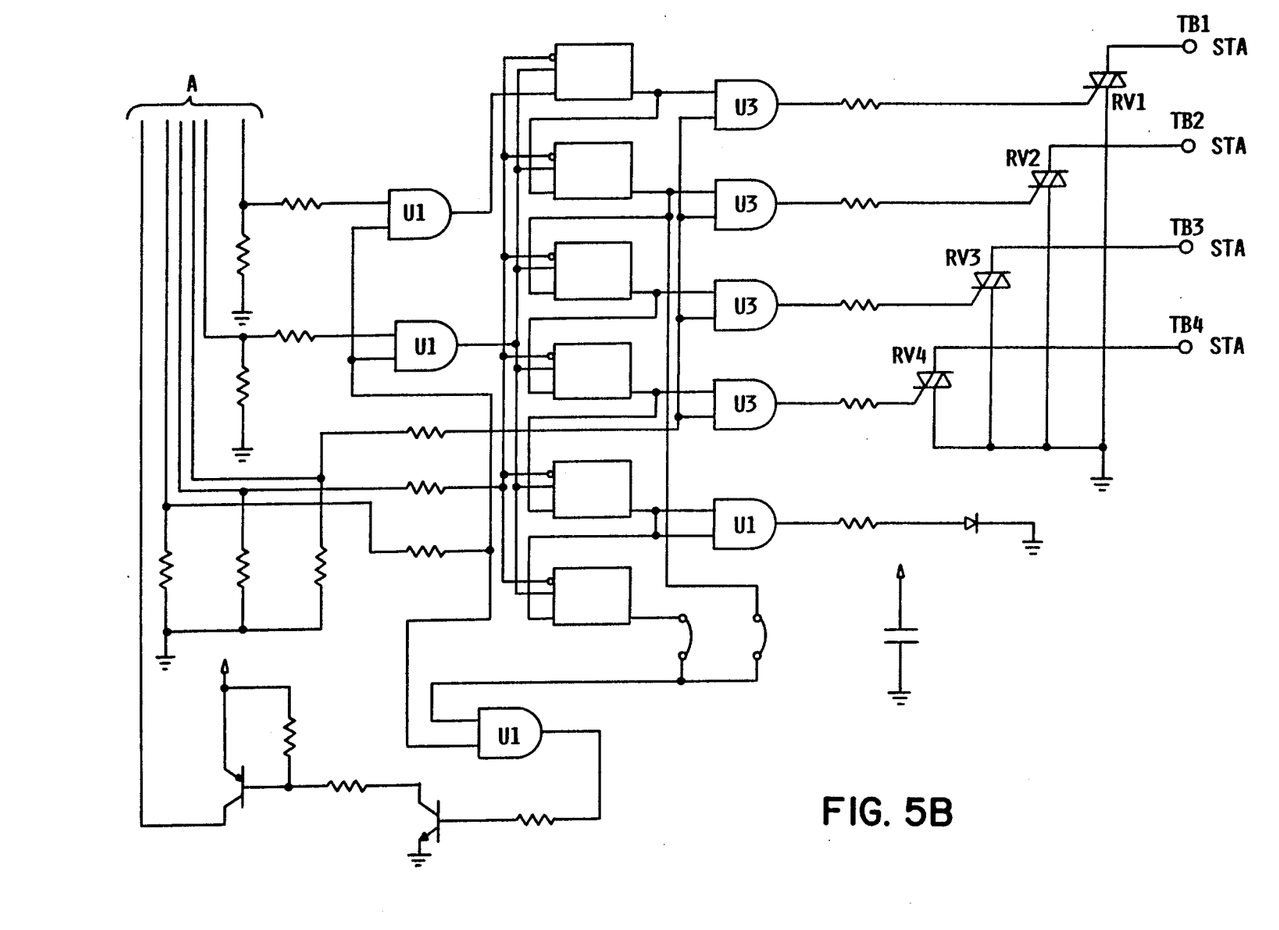

One major purpose of modules 30 is to allow the drivers and output switches for additional stations to be housed in the modules 30 and not the base unit 2. As shown in FIGS. 5A-5B; a four station module is shown in which drivers U3 are connected to TRIACS RV1-RV4 that control various station terminals TB1-TB4 on a four terminal output strip. FIGS. 5A-5B illustrate a four station module which is provided when jumper W1 is installed. In addition, module 30 can be provided in a two station form if jumper W2 is installed, instead of jumper W1, when the module is manufactured. Only one jumper is installed at a time so that a particular module 30 has either a two-station form or a four-station.

When a station expansion module 30 is connected to base unit 2, the number of stations that can be driven by controller 1 are expanded by the number of stations added by the module. In this regard, microprocessor 20 includes appropriate capacity and software for being able to recognize the type(s) of modules connected to base unit 2, to allow the stations added by such modules to be programmed, and to execute the watering program for the module stations as if they were part of the base unit.

Figure 7:
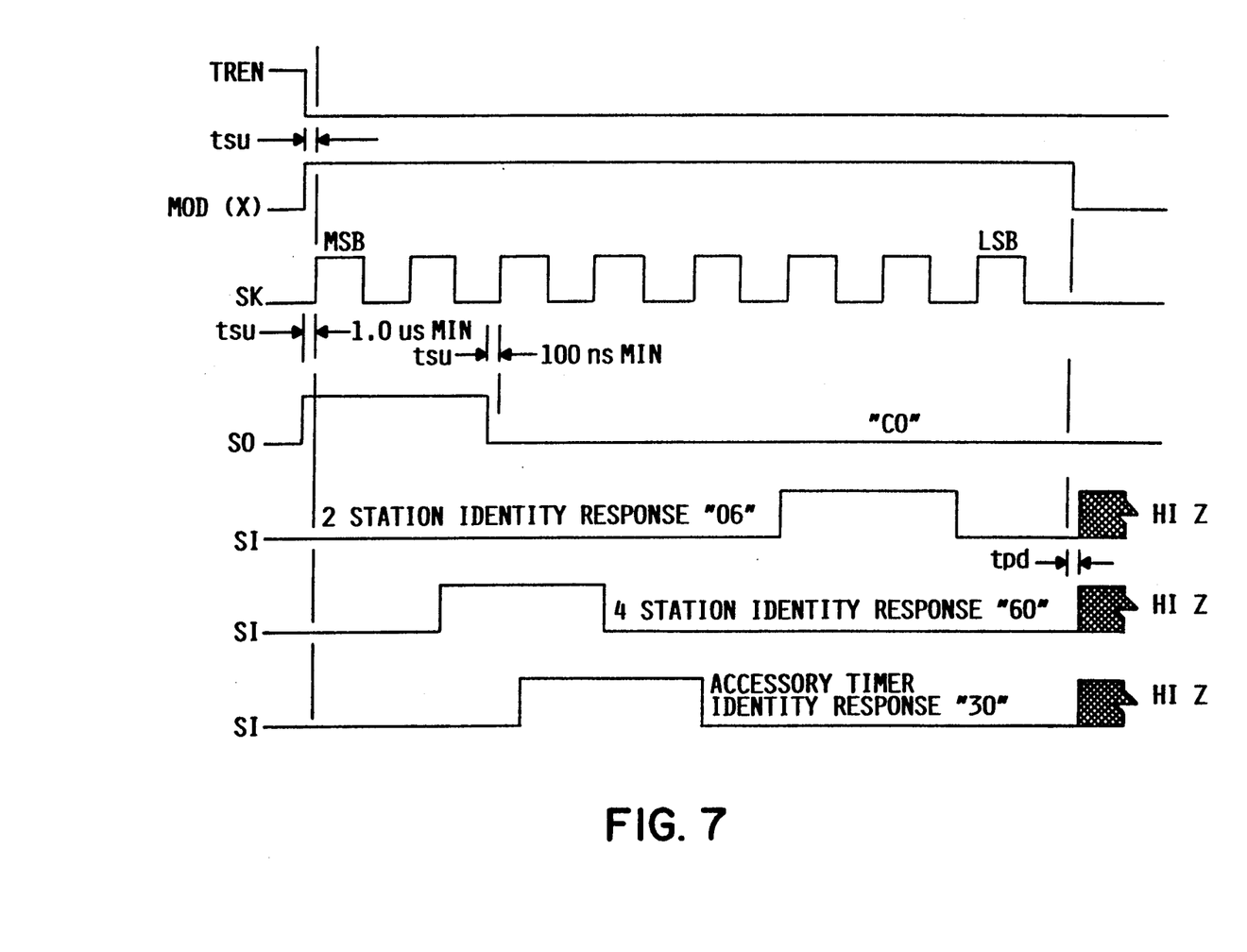
FIG. 7 is a timing diagram view of the controller interrogation and identity responses sent by the different modules.

Referring to FIG. 7, a timing diagram is illustrated for module interrogation and recognition by base unit 2. Whenever power is applied to base unit 2, the base unit sends a query signal as illustrated by S0 along trace 5 of the serial bus. If a module is connected to base unit 2, this query signal is applied to shift register circuitry in module 30 which serves to shape and return the signal to base unit 2 as shown at SI along trace 7. The nature of the returned signal, or response by module 30, varies according to module type. For example, the 4 station identity response SI returns earlier in the timing cycle than the 2 station identity response. Thus, base unit 2 polls the modules along trace 5 upon power up and listens for responses along trace 7 to determine the presence and type of modules 30 connected to it. This information is then stored in the microprocessor for use, i.e. there is a module 1 which is a four station module, there is a module 2 which is a 2 station module, and so on.

If station expansion modules are added to base unit 2, the microprocessor can be programmed to activate the module stations in much the same manner as base unit after the original 4 stations provided by the microprocessor are programmed. In this regard, rotary knob 12 includes a "Next Module" position which follows the "run" times setting. Thus, after the start times have been input and the run times of the original 4 stations in base unit 2 are set, knob 12 may be moved to the Next Module position. With knob 12 in this position, a specific module may be selected by using the plus/minus control buttons 14c and 14d to cycle through all the modules then connected to base unit 2 with the currently selected module having its indicator light 36 illuminated.

In any event, when a particular module has been selected for programming, as indicated by light 36, the knob 12 can be moved out of the "Next Module" position to allow programming of the microprocessor for the selected module. For example, knob 12 is moved back to the "run" times settings and sequenced through stations 1-4 set thereon to allow the run times for the 4 stations added by the module to be programmed in a manner generally similar to base unit 2, i.e. using the plus/minus control buttons and by observing display 16. If module 30 is only a 2 station module, microprocessor 20 will allow programming of only the first two stations. Setting rotary knob 12 opposite the run time numbers 3 and 4 in a two station module will not bring a response, i.e. display 16 will remain blank and no programming is allowed.

Besides the station modules 30, a pump module 30 is also desirably provided. The pump module 30 is basically a single station module 30 which is used whenever the irrigation system requires a separate powered pump to pressurize the water supply. In this regard, most irrigation pumps are driven from 110 VAC power which is wired to the pump, but there is often a control interface, a solenoid or other relay, on or near the pump that has to be actuated to supply the 110 VAC power to the pump. In the case of pump module 30, the pump module is used to actuate the interface only and not directly power the pump. Base unit 2 has a 24 VAC tap which is active whenever irrigation at any station is called for and which is wired to the pump interface when the pump is present. The pump module is basically a TRIAC switch inserted into the ground line for the pump interface which switch is normally open. Thus, closing the TRIAC will complete the power circuit to the pump interface, actuating the pump interface, and causing 110 Volt AC power to be applied to the pump thus allowing the pump to operate.

Figure 6A:
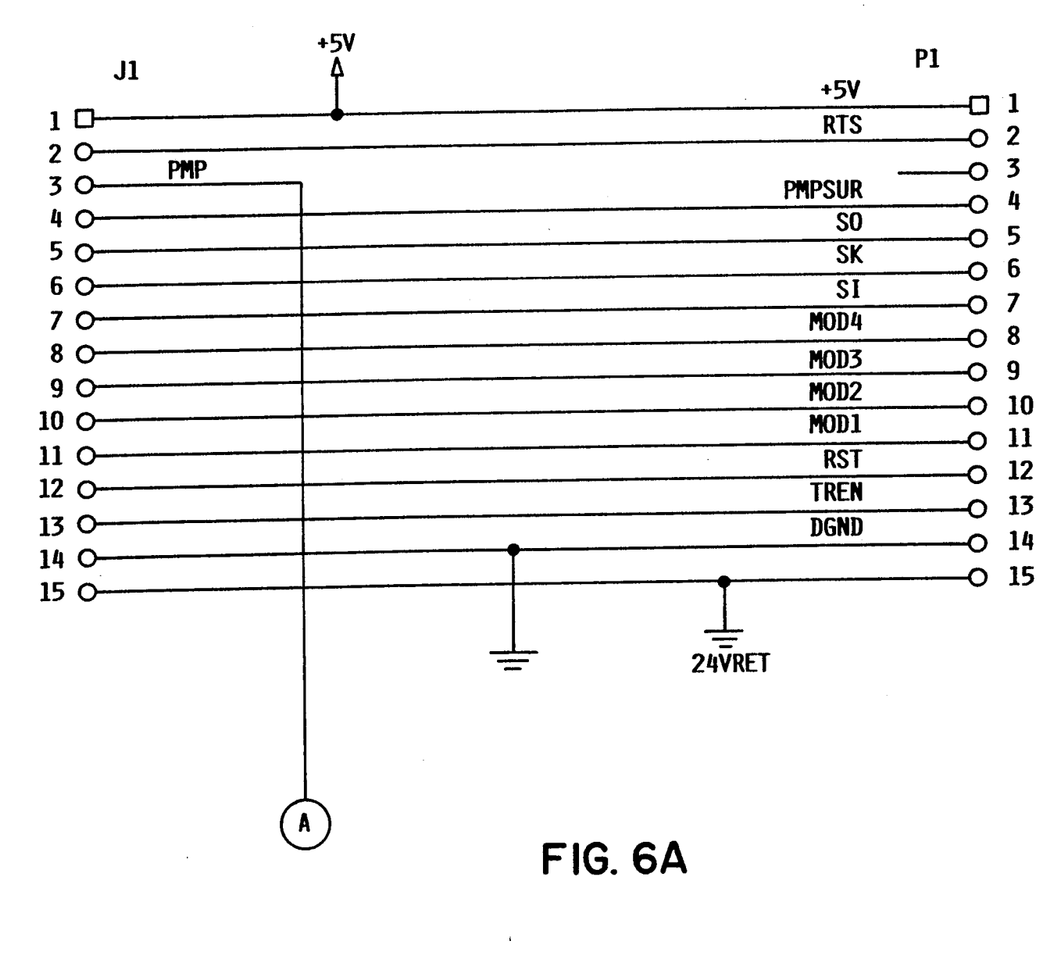
FIGS. 6A-6B comprise a circuit diagram of a pump module of the irrigation controller of the present invention.
Figure 6B:
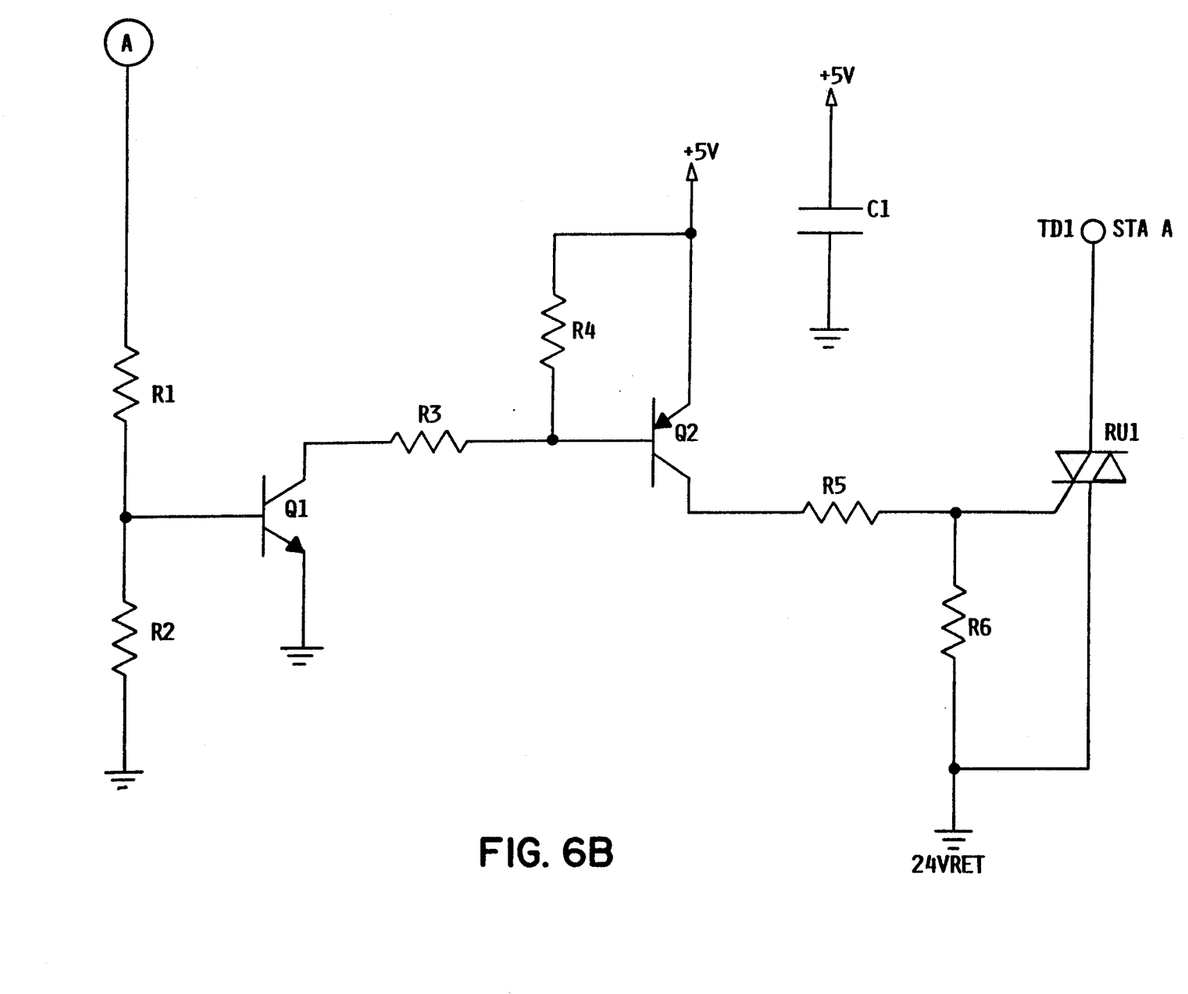

FIGS. 6A-6B disclose a schematic circuit diagram for the pump module. The normally open TRIAC switch is shown at RV1 along with the appropriate driving circuitry. One interesting thing about the pump module is that the interrogation and response sequence, and the associated circuitry therefor, is absent as a separate pump trace 3 is provided in the serial bus structure. This pump trace 3 in the pump module is brought into the internal circuitry for activating the TRIAC. Thus, whenever base unit 2 determines that watering is required, it simultaneously applies power to the 24 VAC tap (to power or actuate the pump interface if a pump is connected) and sends an actuating signal along trace 3 to close the pump interface circuit (if a pump module is present).

Pump module 30 can be used to control either a pump or a master valve, i.e. a valve which when actuated supplies water to an entire group of valves or stations. In each case, pump module 30 is being used to operate or actuate the interface element, e.g. the solenoid or relay, which opens the master valve or causes power to be applied to the pump.

Finally, an accessory timer module 30 is also desirable offered as part of the irrigation controller. Such a module 30 would be provided for driving a set of outdoor lights, either low voltage lighting or even 110 VAC lighting. In its simplest form, such a module would be a single station module used for activating a light system to cause all of the lights to turn on at a particular time when directed by base unit 2.

Preferably, the accessory timer module 30 could be programmed independently of the irrigation sequence with base unit 2, in effect, storing a separate lighting program. In this regard, the module 30 would have appropriate signal shaping circuitry so that it sends a distinctive recognition signal SI back to the base unit when interrogated to allow the base unit 2 to recognize a particular module as an accessory timer module. Again see the timing diagram of FIG. 7. Thus, when that module is reached for programming through the manipulation of rotary knob 2, the microprocessor 20 would recognize it as an accessory timer module, and not as an irrigation station module, and allow it to be separately programmed.

In this regard, it would be desirable to be able to set at least the start and run times independently for the accessory timer module. Thus, when such a module is being programmed, knob 12 could be rotated back to the start times setting to allow at least one separate start time to be input into the microprocessor for the lights. Then, at least one run time could be input for the lights. In addition, the active days setting is also desirably programmable separately for the accessory timer so that the lights could be activated every day, for example, instead of only on the active days for the irrigation sequence. In any event, when microprocessor 20 is programmed to remember the accessory timer information, the drivers and output switches in the accessory timer module would be independently actuated by the microprocessor in accordance with the accessory timer module instructions to turn lights, or some other accessory device, on and of. This could be done by having the accessory timer module 30 actuate a separate control interface, e.g. a relay or solenoid, which causes an external source of power to be applied to the accessory device being controlled as described with respect to the pump module 30.

The advantage of controller 1 of this invention is that base unit 2 is provided in a minimum station configuration, without the pump circuitry, and without any lighting capability, that would be suitable for the users of many irrigation systems. For example, many users have irrigation systems which are installed on city water systems and which have 4 or less stations. Such a user would need purchase only the base unit 2 to control such a system. The user would not have spent any additional money for things not then required, i.e., additional station capacity, pump circuitry, and circuitry and drivers for driving lights.

However, in the event the user's irrigation system expands, so that more irrigation stations are now required, all the user has to do is buy an appropriate station module 30 and plug it into the side of base unit 2 through the interconnecting bus connectors. This would then provide the additional station capacity that is required without requiring the purchase of a new and larger controller. As noted earlier, microprocessor 20 desirably has the capacity and the software required to program and drive up to twelve irrigation stations, though a higher or lower number of maximum stations could be provided. Thus, two additional four-station modules 30 could be bought to give a total of twelve stations. Two-station modules 30 could be purchased to give additional increments of less than 4 stations if so desired.

Similarly, if the particular system of the user had a pump requiring pump activation, or if a pump were later added to the system, then the pump module 30 would be bought to drive the pump. Similarly, the accessory timer module 30 would be provided to drive a lighting system if and only if the user had or added such a lighting system. While lighting has been described as one possible accessory use, the accessory timer module could be used to actuate other items, e.g. a motor which operate on 110 V or 240 V power. Accordingly, controller 1 of the present invention is well adapted for being tailored to the user's precise requirements.

In addition, base unit 2 and modules 30 have an attractive and integrated appearance.

Various modifications of this invention will be apparent to those skilled in the art. For example, the present invention desirably includes station expansion, pump and accessory timer modules all of which are available and could be coupled to base unit. However, each of the modules is individually useful with respect to the base unit and could be used whether any of the other modules are offered or are available. Accordingly, the scope of the present invention will be defined only by the appended claims.

We claim:

1. An irrigation controller which comprises:
   (a) a base unit having logic means for storing and executing an irrigation program with the logic means having sufficient capacity for controlling a plurality of irrigation stations up to a predetermined maximum number of stations, wherein the base unit includes driver and switch means for actuating a predetermined minimum number of irrigation stations which is less than the maximum number of stations which can be controlled by the logic means;
   (b) at least one station expansion module which contains the driver and switch means for an incremental number of stations; and
   (c) means for selectively coupling the station module to the base unit to expand the number of stations that can be controlled, wherein the total number of stations controlled by the logic means is the number of stations provided by the driver and switch means on the base unit and the driver and switch means on the stations modules connected to the base unit up to the maximum number of stations.

2. An irrigation controller as recited in claim 1, wherein the base unit and station modules are connected together by a serial bus.

3. An irrigation controller as recited in claim 1, wherein the serial bus includes a plurality of module traces which are equal in number to a maximum number of station modules that may be used to provide the maximum number of irrigation stations, wherein the serial bus in the base unit has an output side in which the module traces for consecutive station modules are consecutively ranked in a vertical array from a trace for a first station module to a trace for a last station module, and wherein the serial bus in each station module has an input side in which the module trace for the first station module is terminated and has an output side in which the remaining module traces are vertically shifted one position so that the module trace for each successive station module occupies the position of the module trace for a preceding station module, whereby the serial bus traces in each station module may be identical in manufacture but each station module will be appropriately communicated with by the base unit when a plurality of station modules are serially connected to the base unit by the serial bus.

4. An irrigation controller as recited in claim 1, further including a pump module which contains switch means for actuating a source of water for irrigation purposes, and wherein the pump module includes means for selectively coupling the pump module to the base unit or to any station module that is connected to the base unit.

* * * * *